US007134270B2

(12) United States Patent
Tigane

(10) Patent No.: US 7,134,270 B2
(45) Date of Patent: Nov. 14, 2006

(54) EXTERNAL COMBUSTION ENGINE

(75) Inventor: Rein Tigane, Vantaa (FI)

(73) Assignee: Tigan Holding Oy, Espoo (FI)

( * ) Notice: Subject to any disclaimer, the term of this patent is extended or adjusted under 35 U.S.C. 154(b) by 113 days.

(21) Appl. No.: 10/511,635

(22) PCT Filed: Apr. 11, 2003

(86) PCT No.: PCT/FI03/00278

§ 371 (c)(1),
(2), (4) Date: Oct. 18, 2004

(87) PCT Pub. No.: WO03/087563

PCT Pub. Date: Oct. 23, 2003

(65) Prior Publication Data

US 2005/0198962 A1 Sep. 15, 2005

(30) Foreign Application Priority Data

Apr. 18, 2002 (FI) .................................. 20020743

(51) Int. Cl.
*F02C 5/00* (2006.01)

(52) U.S. Cl. .......................................... 60/39.6; 60/683

(58) Field of Classification Search .................. 60/650, 60/682, 683, 39.6

See application file for complete search history.

(56) References Cited

U.S. PATENT DOCUMENTS

| | | | | |
|---|---|---|---|---|
| 3,756,022 A | | 9/1973 | Pronovost et al. | 60/683 |
| 3,893,300 A | * | 7/1975 | Connell | 60/683 |
| 4,077,221 A | * | 3/1978 | Maeda | 60/650 |
| 4,120,161 A | | 10/1978 | Gedeit | 60/682 |
| 4,164,124 A | * | 8/1979 | Taylor et al. | 60/683 |
| 4,336,686 A | | 6/1982 | Porter | 60/39.63 |
| 4,492,085 A | * | 1/1985 | Stahl et al. | 60/649 |
| 4,751,819 A | * | 6/1988 | Eder | 60/517 |
| 5,755,100 A | * | 5/1998 | Lamos | 60/521 |
| 6,736,090 B1 | * | 5/2004 | Ichikawa | 123/65 A |

FOREIGN PATENT DOCUMENTS

| | | | | |
|---|---|---|---|---|
| DE | 3616001 A1 | * | 11/1987 | 60/517 |
| GB | 498882 | | 1/1939 | |

* cited by examiner

*Primary Examiner*—Hoang Nguyen
(74) *Attorney, Agent, or Firm*—Volpe & Koenig, P.C.

(57) ABSTRACT

An external combustion engine comprising a body (8), at least one working chamber (18), combustion chamber (13), crankcase (21) and compression chamber (6), at least one working piston (20), compression piston (7) and crank mechanism (22), and a valve gear and a heat exchanger, and wherein the required air is drawn by suction from the air surrounding the engine via valves or equivalent. After the working cycle, the expanded hot air is directed from the working chamber (18) through a valve (12) or (24) past the heater (17) into the combustion chamber (13), to be used as combustion air.

5 Claims, 1 Drawing Sheet

EXTERNAL COMBUSTION ENGINE

The present invention relates to an external combustion engine as defined in the preamble of claim 1.

A prior-art external combustion engine is known from U.S. Pat. No. 4,336,686, which describes a rotating external combustion engine having a radial piston compressor, a continuous combustion chamber and a radial piston expander and means for supplying fuel into the combustion chamber.

Prior-art machines have the drawback that they are complicated, difficult to service and they need a separate cooler, or the cycle lacks a compression phase.

The object of the present invention is to achieve a freely breathing external combustion engine that has a simple construction and involves low maintenance costs.

The external combustion engine of the invention works on the principle that the working gas (air) is changed after each revolution and after the working cycle the expanded hot air is passed from the working chamber through a valve into the combustion chamber, to be used as combustion air. The working air can be preheated using the exhaust gas from the combustion chamber by means of a heat exchanger.

The characteristic features of the external combustion engine of the invention are presented in detail in the claims below.

The invention affords several advantages: No cooling is needed as cold air is taken from outside the engine. The engine is easy to seal because it works with a low pressure and possible leakages are compensated for during each revolution.

Figure 1:
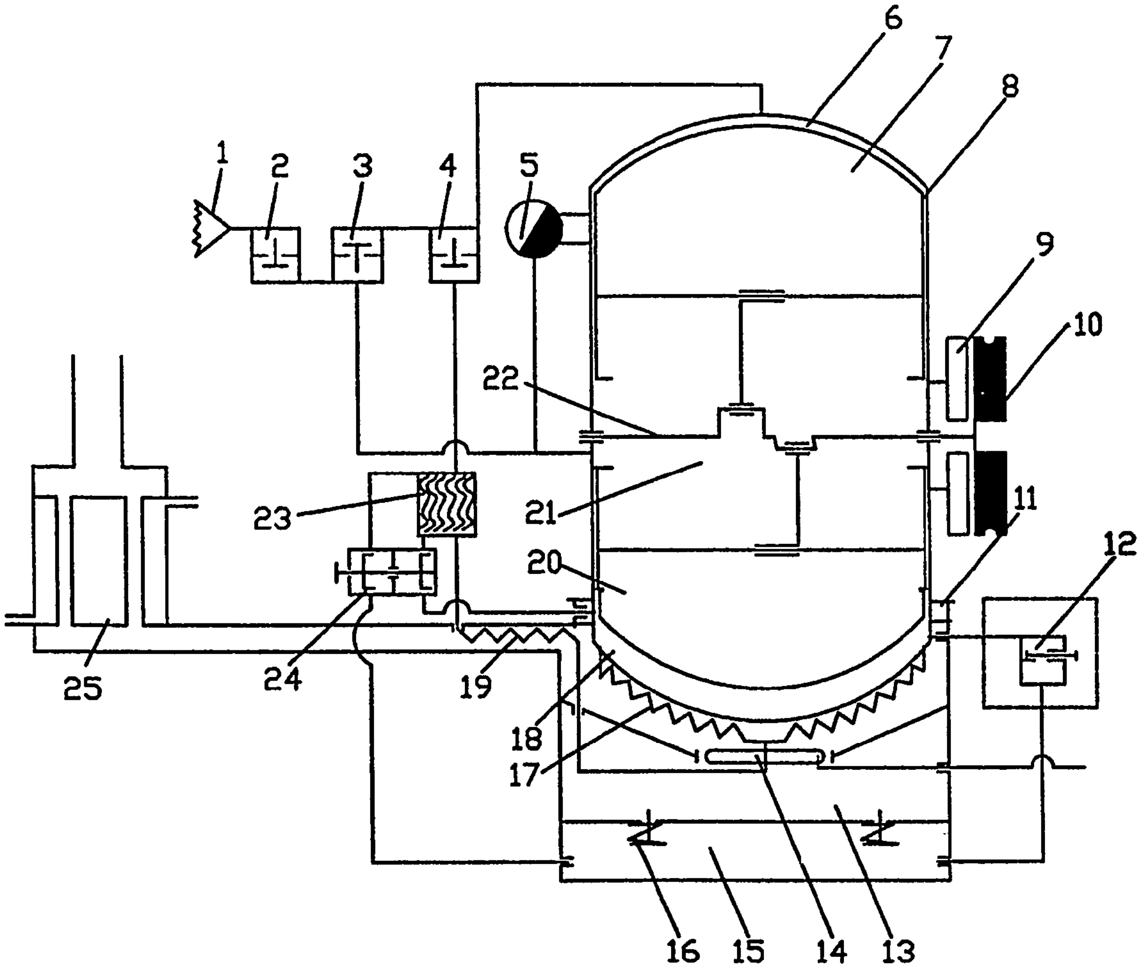
Figure 2:
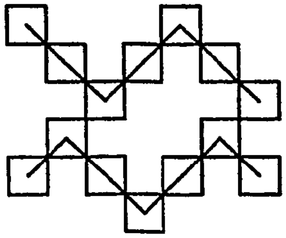
Figure 3:
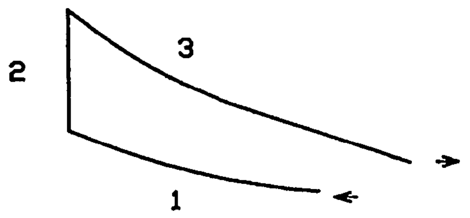

In the following, the invention will be described in detail by the aid of an example with reference to the attached drawing, wherein FIG. 1 presents a diagram of the structure and working principle of the freely breathing external combustion engine of the invention, FIG. 2 is a graphic representation of the phasing of the pistons of the engine, and FIG. 3 presents a diagram of the pressure-volume cycles of the engine.

The working principle of the freely breathing heat engine or hot-air engine is as follows: Outer air is drawn via a filter 1 and an opened valve 2 into the crankcase 21, where it is pre-compressed and drawn by suction via a valve 3 into the compression chamber 6, where it is compressed. (FIG. 3 phase 1).

The compressed air is passed through a regenerator 23 into a preheater 19 and further via a heat exchanger 17 into the working chamber 18. (FIG. 3 phase 2). The hot air performs a working cycle (FIG. 3 phase 3) by pushing the working piston 20 into the upper position. The expanded hot air is removed by the movement of the working piston via the regenerator 23 when valve 24 is open.

The hot air having performed a working cycle is utilized by transferring the residual heat and overpressure into the combustion process. Through an opened valve 24, the hot air is passed via a pressure equalization chamber 15 and pressure compensating valves 16 into the combustion chamber 13 and to the burner 14.

Depending on the heat requirement of the boiler 25, it is possible to use direct exhaust air connection via valve 12. In this case, the regenerator 23 and valve 24 are turned off and valve 4 is connected directly to the preheater 19.

Valves 12 and 24 are positively controlled. Valves 2, 3 and 4 are also in practice rotating valves at the end of the crankshaft.

Power control and starting are accomplished by means of valve 5 by reducing the active volume of the compression chamber 6. As the engine requires no cooling equipment, the engine body 8 is a simple tube which houses a compression piston 7, a crank mechanism 22 and a working piston 20. The hot area of the working chamber 18 is insulated with a heat insulating seal 11. Mounted on the body 8 is the stator 9 of an electric generator, and the rotor-flywheel of the generator is mounted on the end of the crankshaft 22.

The engine is primarily intended for gaseous or liquid fuels, but with an auxiliary burner it is also possible to use solid fuel.

The engine is intended for the production of electricity in non-built-up areas and for the production of heat and electricity in detached houses. The engine is also applicable for use as a power source in boats and garden machines.

The engine may preferably have a tubular body containing a crank mechanism and two pistons moving in a phased manner in opposite directions.

It is obvious to the person skilled in the art that different embodiments of the invention are not limited to the embodiments described above, but that they may be varied within the scope of the claims presented below.

The invention claimed is:

1. External combustion engine, comprising a body, at least one working chamber, combustion chamber, crankcase and compression chamber, at least one working piston, compression piston and crank mechanism, and a valve assembly and a heat exchanger, wherein the required air is drawn by suction via valves from the air surrounding the engine, and wherein the expanded hot air is directed after the working cycle from the working chamber through a valve or past the heater into the combustion chamber, to be used as combustion air, and wherein the air used as working gas is drawn by suction through a valve into the crankcase, where the air is pre-compressed and from where the pre-compressed air can be moved through a valve into the compression chamber.

2. Engine according to claim 1, wherein in an isochoric phase of the process, the working air is preheated by the exhaust gas from the combustion chamber by means of the heat exchanger.

3. Engine according to claim 1, wherein control of power by reducing the mean pressure is accomplished by reducing the compression volume of the compression chamber by means of a power control and starting valve.

4. Engine according to claim 1, wherein the machine has a substantially tubular body containing a crank mechanism and two pistons moving in a phased manner in opposite directions.

5. Engine according to claim 1, wherein the hot air can be passed through an opened valve via a pressure equalization chamber and pressure compensating valves into the combustion chamber and to a burner.

* * * * *